US011210332B2

(12) United States Patent
Thielbar et al.

(10) Patent No.: US 11,210,332 B2
(45) Date of Patent: Dec. 28, 2021

(54) MAPPED VIEWS OF DIGITAL CONTENT

(71) Applicant: Sony Interactive Entertainment LLC, San Mateo, CA (US)

(72) Inventors: Christopher Thielbar, San Francisco, CA (US); Matthew Bloom-Carlin, San Francisco, CA (US); Yuji Tsuchikawa, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/278,537

(22) Filed: Feb. 18, 2019

(65) Prior Publication Data

US 2020/0265078 A1    Aug. 20, 2020

(51) Int. Cl.
*G06F 16/44* (2019.01)
*H04N 21/45* (2011.01)
*H04N 21/475* (2011.01)
*H04N 21/472* (2011.01)

(52) U.S. Cl.
CPC ......... *G06F 16/44* (2019.01); *H04N 21/4532* (2013.01); *H04N 21/472* (2013.01); *H04N 21/4755* (2013.01)

(58) Field of Classification Search
CPC ........... H04N 21/4532; H04N 21/4755; H04N 21/472; G06F 16/44
See application file for complete search history.

(56) References Cited

U.S. PATENT DOCUMENTS

| 9,968,856 | B1* | 5/2018 | Ninoles ................. A63F 13/355 |
| 10,284,907 | B2* | 5/2019 | Gefen ............... H04N 21/44016 |
| 10,820,034 | B2* | 10/2020 | Amento ........... H04N 21/41407 |
| 2009/0144785 | A1 | 6/2009 | Walker et al. |

(Continued)

FOREIGN PATENT DOCUMENTS

WO    WO 2020/171966    8/2020

OTHER PUBLICATIONS

PCT Application No. PCT/US2020/016970 International Search Report and Written Opinion dated Apr. 30, 2020.
PCT/US20/16970, Mapped Views of Digital Content, Feb. 6, 2020.

*Primary Examiner* — Yassin Alata
(74) *Attorney, Agent, or Firm* — Polsinelli LLP

(57) ABSTRACT

Systems and methods for mapped views of digital content are provided. A map structure for a collection of digital content streams from a content provider may be stored in memory. Such map structure may include a predetermined plurality of slots arranged in one or more tiers. A browsing request may be received from a spectator device over a communication network, and such browsing request may be identified as pertaining to the collection of digital content streams. A mapped view of the requested collection may be generated that illustrates the predetermined plurality of slots arranged in the tiers in accordance with the stored map structure. Further, information regarding browsing activity by the spectator device within the generated mapped view may be received and evaluated to identify when the spectator device selects one of the illustrated slots. As such, one of the digital content streams in the collection may be identified as being associated with the selected slot, and the identified digital content stream may be launched.

25 Claims, 5 Drawing Sheets

(56) References Cited

U.S. PATENT DOCUMENTS

| | | | |
|---|---|---|---|
| 2009/0148124 A1* | 6/2009 | Athsani | H04L 12/1831 |
| | | | 386/241 |
| 2015/0248817 A1 | 9/2015 | Steir et al. | |
| 2017/0061314 A1* | 3/2017 | Schnurr | H04N 21/25891 |
| 2017/0266552 A1* | 9/2017 | Paradise | A63F 13/44 |
| 2020/0094149 A1* | 3/2020 | Gonzales, II | H04N 21/2187 |

* cited by examiner

MAPPED VIEWS OF DIGITAL CONTENT

BACKGROUND OF THE INVENTION

1. Field of the Invention

The present invention generally relates to digital content. More specifically, the present invention relates to providing mapped views of digital content.

2. Description of the Related Art

Presently available digital content streams may be related in a variety of ways. For example, a sports playoff series or tournament may be associated with bracketed or round robin structures with multiple rounds. Another example is a music, comedy, or arts festival with multiple concurrent shows. Presently available ways of accessing digital content streams fail, however, to reflect such structure and relationships. FIGS. 1A and 1B are screenshots of exemplary user interfaces that present digital content streams in list form or in tile form, respectively. As can be seen in the screenshots of FIGS. 1A and 1B, such presentation may or may not reflect any particular order or relationship to other streams. As a result, a spectator browsing for content may lack the context needed to understand where a particular stream fits into among other streams.

Another problem arising from such lack of contextual or structural information is that the spectator may find it inconvenient or time-consuming to browse or otherwise search for a particular stream or key matches (e.g., finals and semi-finals versus qualifying rounds). In some instances, naming conventions or tags may be used to provide additional information and facilitate searches. Such tools depend, however, on the spectator having some familiarity, institutional knowledge, or other background information regarding the event and structure thereof. Such requirements may further represent barriers to entry for spectators, casual browsers, and others new to the event, making continuing and deepening user engagement more difficult.

There is, therefore, a need in the art for improved systems and methods of providing mapped views of digital content.

SUMMARY OF THE CLAIMED INVENTION

Embodiments of the present invention allow for mapped views of digital content. A map structure for a collection of digital content streams from a content provider may be stored in memory. Such map structure may include a predetermined plurality of slots arranged in one or more tiers. A browsing request may be received from a spectator device over a communication network, and such browsing request may be identified as pertaining to the collection of digital content streams. A mapped view of the requested collection may be generated that illustrates the predetermined plurality of slots arranged in the tiers in accordance with the stored map structure. Further, information regarding browsing activity by the spectator device within the generated mapped view may be received and evaluated to identify when the spectator device selects one of the illustrated slots. As such, one of the digital content streams in the collection may be identified as being associated with the selected slot, and the identified digital content stream may be launched.

Various embodiments of the present invention may include methods for providing mapped views of digital content. Such methods may include storing a map structure for a collection of digital content streams from a content provider where the map structure includes a predetermined plurality of slots arranged in one or more tiers. Methods may further include receiving a browsing request from a spectator device over a communication network that pertains to the collection of digital content streams, generating a mapped view of the requested collection that illustrates the predetermined plurality of slots arranged in the tiers in accordance with the stored map structure, receiving information regarding browsing activity by the spectator device within the generated mapped view indicating that the spectator device has selected one of the illustrated slots, and launching play of one of the digital content streams in the collection that is identified as associated with the selected slot.

Further embodiments of the present invention may include systems for providing mapped views of digital content. Such systems may include a database in memory that stores a map structure for a collection of digital content streams from a content provider where the map structure includes a predetermined plurality of slots arranged in one or more tiers. Systems may further include a communication interface that receives a browsing request from a spectator device over a communication network that pertains to the collection of digital content streams and a processor that generates a mapped view of the requested collection illustrating the predetermined plurality of slots arranged in the tiers in accordance with the stored map structure, receives information regarding browsing activity by the spectator device indicating that the spectator device has selected one of the illustrated slots, and launches play of one of the digital content streams in the collection identified as associated with the selected slot.

Yet further embodiments of the present invention may include non-transitory computer-readable storage media having embodied thereon a program executable by a processor to perform a method for providing mapped views of digital content as described above.

BRIEF DESCRIPTIONS OF THE DRAWINGS

DETAILED DESCRIPTION

Embodiments of the present invention allow for mapped views of digital content. A map structure for a collection of digital content streams from a content provider may be stored in memory. Such map structure may include a predetermined plurality of slots arranged in one or more tiers. A browsing request may be received from a spectator device over a communication network, and such browsing request may be identified as pertaining to the collection of digital content streams. A mapped view of the requested collection may be generated that illustrates the predetermined plurality of slots arranged in the tiers in accordance with the stored map structure. Further, information regarding browsing activity by the spectator device may be received and evaluated within the generated mapped view to identify when the spectator device selects one of the illustrated slots. As such, one of the digital content streams in the collection may be identified as being associated with the selected slot, and the identified digital content stream may be launched.

Figure 1A:
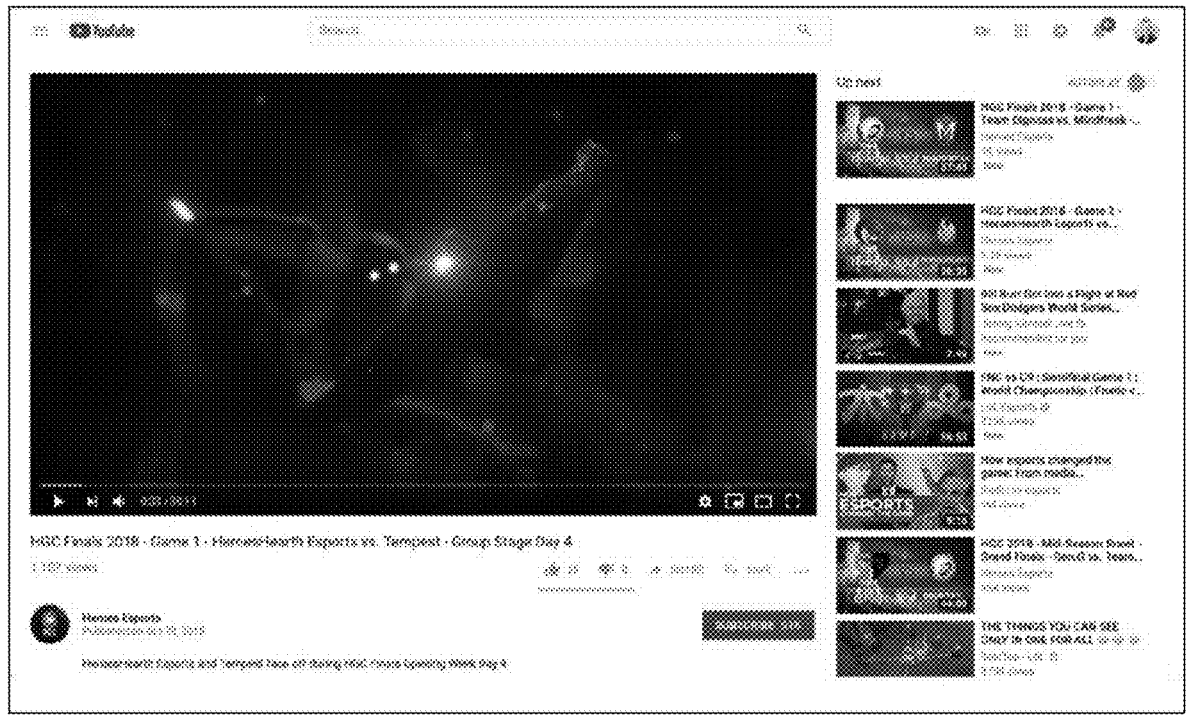
FIG. 1A is a screenshot illustrating an exemplary user interface used to present available digital content streams.
Figure 1B:
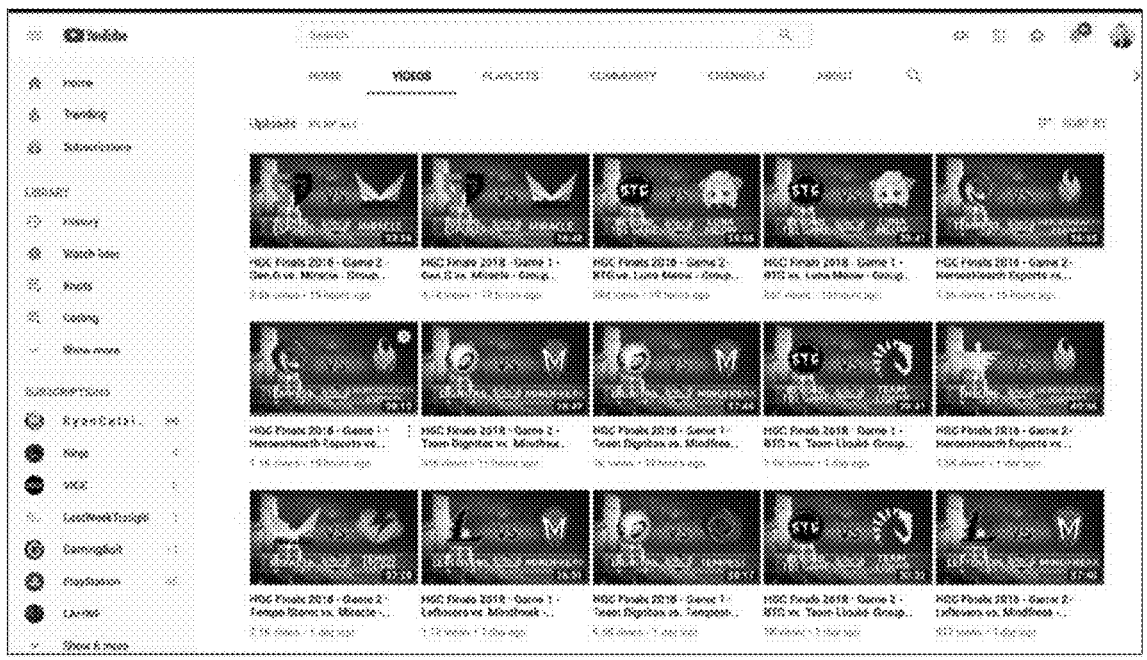
FIG. 1B is a screenshot illustrating another exemplary user interface used to present available digital content streams.
Figure 2:
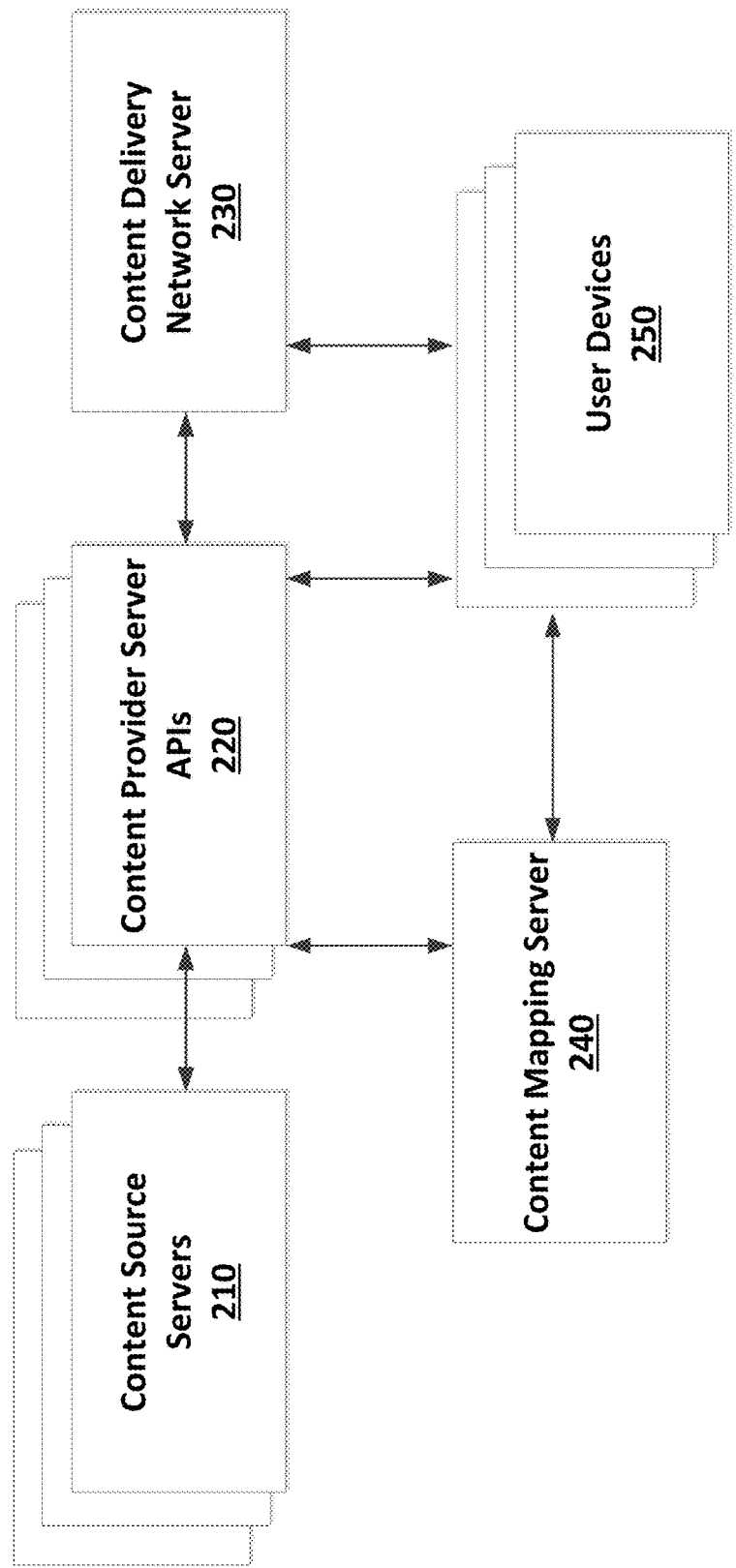
FIG. 2 illustrates an exemplary network environment in which a system for providing mapped views of digital content may be implemented.

FIG. 2 illustrates an exemplary network environment 200 in which a system for providing mapped views of digital content may be implemented. The network environment 200 may include one or more content source servers 210 that provide digital content (e.g., games, other applications and services) for distribution, one or more content provider server application program interfaces (APIs) 220, content delivery network server 230, a content mapping server 240, and one or more user devices 250. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 210 may maintain and provide a variety of digital content available for distribution. The content source servers 210 may be associated with any content provider that makes its content available for access over a communication network. Such content may include not only digital video and games, but also other types of digital applications and services. Such applications and services may include any variety of different digital content and functionalities that may be provided to user devices 250.

The content from content source server 210 may be provided through a content provider server API 220, which allows various types of content sources server 210 to communicate with other servers in the network environment 200 (e.g., user devices 250). The content provider server API 220 may be specific to the particular language, operating system, protocols, etc. of the content source server 210 providing the content, as well as the user devices 250. In a network environment 200 that includes multiple different types of content source servers 210, there may likewise be a corresponding number of content provider server APIs 220 that allow for various formatting, conversion, and other cross-device and cross-platform communication processes for providing content and other services to different user devices 250, which may use different operating systems, protocols, etc., to process such content. As such, applications and services in different formats may be made available so as to be compatible with a variety of different user device 250.

The content provider server API 220 may further facilitate access of each of the user devices 250 to the content hosted or services provided by the content source servers 210, either directly or via content delivery network server 230. Additional information, such as metadata, about the accessed content or service can also be provided by the content provider server API 220 to the user device 250. As described below, the additional information (i.e. metadata) can be usable to provide details about the content or service being provided to the user device 250. In some embodiments, the services provided from the content source servers 210 to the user device 250 via the content provider server API 220 may include supporting services that are associated with other content or services, such as chat services, ratings, and profiles that are associated with a particular game, team, community, etc. In such cases, the content source servers 210 may also communicate with each other via the content provider server API 220.

The content delivery network server 230 may include a server that provides resources, files, etc., related to the content from content source servers 210, including various content and service configurations, to user devices 250. The content delivery network server 230 can also be called upon by the user devices 250 that request to access specific content or services. Content delivery network server 230 may include universe management servers, game servers, streaming media servers, servers hosting downloadable content, and other content delivery servers known in the art.

Content mapping server 240 may include any data server known in the art. In some embodiments, the content mapping server 240 may map digital content collections provided via content source server 210 with or without the involvement of content provider server APIs 220 and content delivery network server 230. In an exemplary implementation, a content provider may wish to provide a structured collection of digital content via content source server 210 to one or more user devices 250.

The user device 250 may include a plurality of different types of computing devices. The user device 250 may be a server that provides an internal service (e.g., to other servers) in network environment 200. In such cases, user device 250 may correspond to one of the content servers 210 described herein. Alternatively, the user device 250 may be a client device that may include any number of different gaming consoles, mobile devices, laptops, and desktops. Such user devices 250 may also be configured to access data from other storage media, such as, but not limited to memory cards or disk drives as may be appropriate in the case of downloaded services. Such user devices 250 may include standard hardware computing components such as, but not limited to network and media interfaces, non-transitory computer-readable storage (memory), and processors for executing instructions that may be stored in memory. These user devices 250 may also run using a variety of different operating systems (e.g., iOS, Android), applications or computing languages (e.g., C++, JavaScript). An exemplary client device 250 is described in detail herein with respect to FIG. 5. Each user device 250 may be associated with participants or other types of spectators of a collection of digital content streams.

A collection of digital content stream may be structure in accordance with a specific structure that may be provided to and stored at content mapping server 240. Specifically, content mapping server 240 may store a map structure for a specified collection of digital content streams from a content provider. The map structure may include a predetermined plurality of slots arranged in one or more tiers. Each slot may correspond to a different digital content stream in the collection. When a visualization of the map is generated, such visualization may illustrate a map that arranges the slots into tiers (or rounds). Each slot may be designated for a different digital content stream in the collection, including streams that may or may not be currently available. For example, slots for the final or championship round may not yet be filled (e.g., with a live link to an available stream) at the start or in the early rounds of the tournament.

A map structure for some playoff tournaments may resemble a bracket, for example, while other types of competition or event structures (e.g., round-robin, team-based, and variations thereof) may also be available. The content mapping server 240 may use such a stored map structure to organize a user interface when a user device 250 indicates a wish to browse through the associated collection. Using the stored map structure and information from content provider (e.g., content sources server 210), content mapping server 240 may generate a mapped view of the requested collection that illustrates the predetermined number of slots arranged in the tiers specified by the stored map structure, Each slot is designated for one or more different digital content streams, which if available may be indicated as such via a link. Such a mapped view may be updated as more digital content streams in the collection become available, and the associated slots may be updated and filled with the respective links to the designated digital content stream.

Some types of competitions (e.g., esports) may involve multiple competitors participating in each match, and each competitor may be generating a respective stream specific to their perspective of the match. As such, a slot corresponding to a match within a tournament may include multiple links each to a different stream (e.g., for each player) associated with the match. A slot corresponding to a head-to-head battle between two players of a first-person role-playing game may therefore include two links for the two streams corresponding to the two players. A spectator device 250 may be allowed to select an individual stream for spectating. In some embodiments, the spectator device 250 may also be given the option to view multiple (synchronized) streams associated with the same match simultaneously.

The content mapping server 240 may further receive information regarding browsing activity by the user device 250 (e.g., a spectator device) in relation to the generated mapped view so as to identify when the user device 250 selects one of the illustrated slots. In some instances, such browsing activity specific to an identified slot may initiate a preview window of the associated digital live content stream. In other instances, the browsing activity may include a request to launch a digital content stream (e.g., selecting a link in one of the slots). As such, the illustrated slot may be identified as being associated with a live stream that is designated part of the collection, and as such, play of the identified live stream may be launched.

At a point in time during play of the digital content stream, the user device 250 may provide feedback regarding the digital content stream. Such feedback may be used to further update the generated mapped view of the collection with a marking indicative of the received feedback regarding the played digital content stream. Such markings may provide another aspect of the collection and digital content stream that other users and spectators may browse. For example, the feedback may be a selection from a menu of different feedback types, including predetermined "Like" options, emojis, or other textual and visual indicators of user reactions. Such menu may be provided during the launched play of the digital content stream. The markings may also be aggregated and tracked over time to identify particularly notable or otherwise trending events. Details regarding the aggregated feedback may also be browsed by other user devices 250.

In some embodiments, digital content may be evaluated with respect to certain indicators, including score changes, sound changes, content-specific parameters (e.g., predetermined in-stream events), timing, etc. Some data may be provided directly by the content provider or host (e.g., content source server 210). For example, where the content source server 210 hosting a game, content source server 210 may directly provide game data regarding live scores, metadata about other in-game characteristics and events, and associated content (e.g., predefined video clips). Such data and metadata—which may be different and tracked differently for each game title—may be analyzed and used to update the generated mapped view with indicators regarding the current scores, level of activity, and availability of associated content.

In addition, in-stream events may also be tracked to identify emerging trends. Certain aspects of the stream that may be tracked and evaluated include audio levels, types of sounds, and statements made and actions taken by players, commentators, or other spectators. Levels of sharing activity, chat activity, or playback activity (e.g. of a particular section of the stream) may likewise trigger indicators to be added to the generated mapped view to indicate points of interest.

Content mapping server 240 may also make a prediction associated with such indicators based on currently detected in-stream events and historical data regarding such events in past games. In some embodiments, predictions may further be based on biometric measurements (e.g., elevated heart rate) provided from players, commentators, and spectators indicative of impending events of significance. Such predictions may include predicted likelihood of winning/losing (including upset wins/losses) or may be predictions regarding certain notable or rare events. Such prediction may also be the basis for certain markings being added to a generated mapped view that further provides additional context and bases for browsing and selection. In some instances, the content mapping server 240 may send a notification to another user device 250 regarding the prediction so that the user of the other user device 250 can tune in to the associated digital content stream to see if the prediction comes true. Such user device 250 may have subscribed or other indicated an interest in the content provider, the collection, specific participants, or other preferences used to formulate the notification. A notification may be sent to opponents or potential opponents in the next round or tier of matches, for example. As such, players may receive a notification that a match has concluded, who the winner of the match is (that will be going onto that next round), and information regarding when the next round may be expected to begin.

Figure 3:
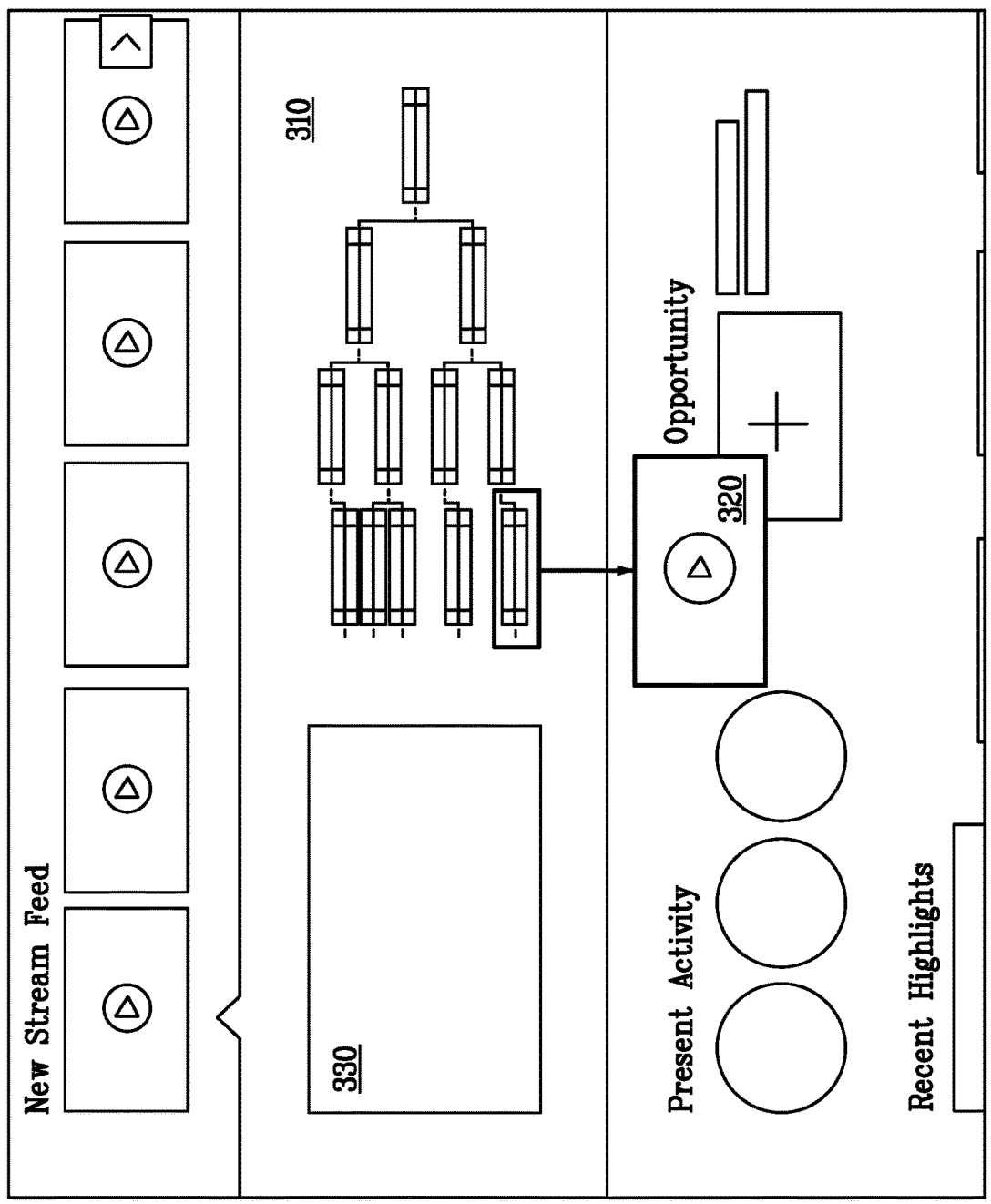
FIG. 3 is a diagram of an exemplary mapped view of digital content that may be provided in accordance with embodiments of the present invention.

FIG. 3 is a diagram of an exemplary mapped view 300 of digital content that may be provided in accordance with embodiments of the present invention. As illustrated, the mapped view may include a specific mapped structure (e.g., bracket 310). The illustrated bracket 310 may include a predetermined number of slots arranged in tiers or rounds. Each slot may be browsable and selectable by a user device 250. A miniaturized preview window 320 may present user device 250 with a sample of the content in the related stream. Meanwhile, a larger window 330 may displayed a launched content stream.

Figure 4:
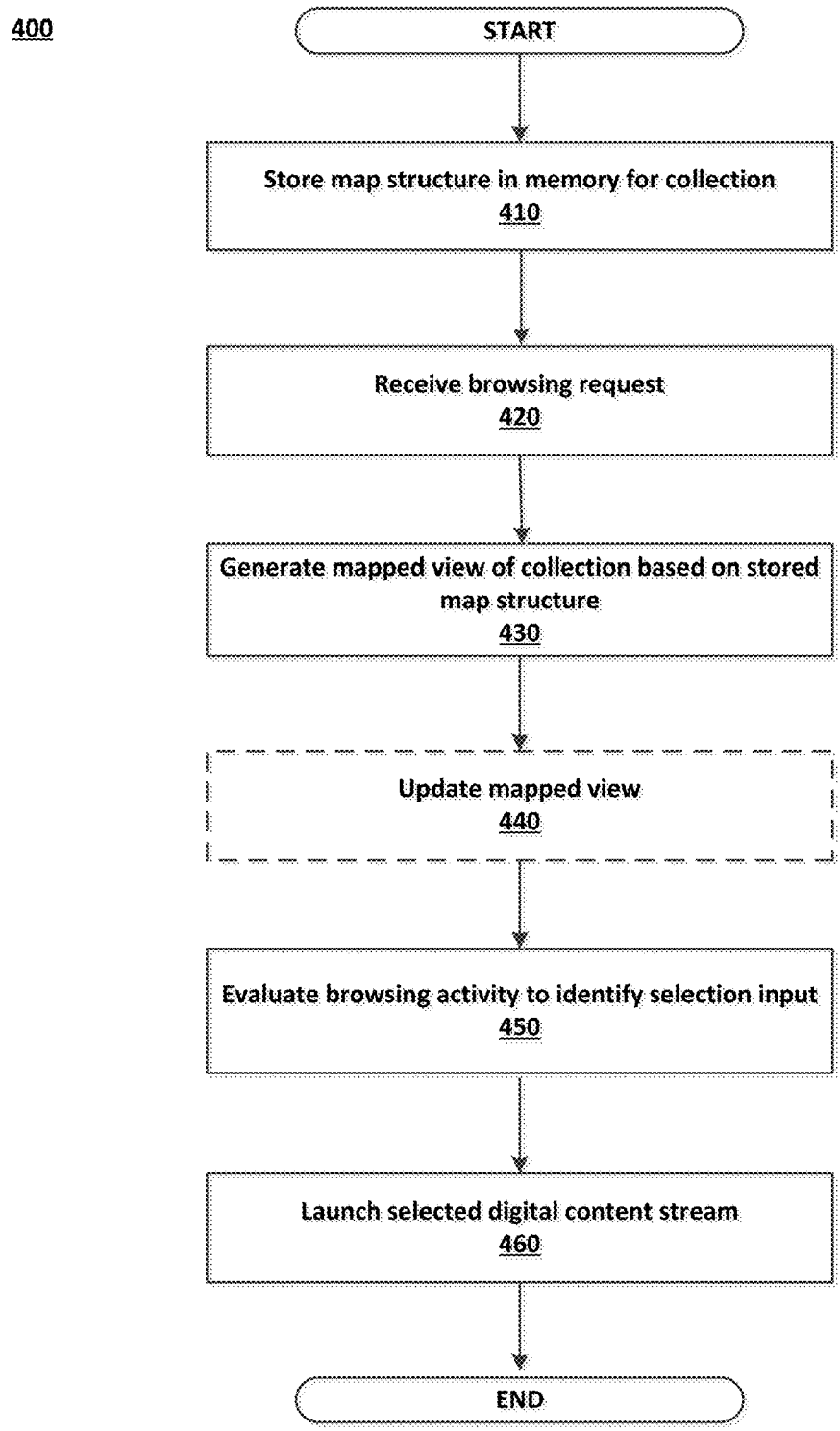
FIG. 4 is a flowchart illustrating an exemplary method for providing mapped views of digital content.

FIG. 4 illustrates a method 400 for providing mapped views of digital content. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 4 (and the order thereof) are exemplary and may include various alternatives, equivalents, or derivations thereof including but not limited to the order of execution of the same.

In method 400 of FIG. 4, a map structure for a collection of digital content streams from a content provider may be stored in memory. Such map structure may include a predetermined plurality of slots arranged in one or more tiers. A browsing request may be received from a spectator device over a communication network, and such browsing request may be identified as pertaining to the collection of digital content streams. A mapped view of the requested collection may be generated that illustrates the predetermined plurality of slots arranged in the tiers in accordance with the stored map structure. Further, information regarding browsing activity by the spectator device within the generated mapped view may be received and evaluated to identify when the spectator device selects one of the illustrated slots. As such, one of the digital content streams in the collection may be identified as being associated with the selected slot, and the identified digital content stream may be launched.

In step 410, a map structure may be stored in memory (e.g. of content mapping server 240) for a collection of digital content streams. Such structure may include a predetermined number of slots corresponding to the designated number of digital content streams for the collection. The slots may be arranged in multiple tiers or rounds. Certain tournaments may be structured as brackets, for example, where each slot represents a stream of a different match in the tournament. The matches in the early rounds (e.g., qualifying rounds) may be represented by slots on the wider, branched parts of the bracket, while later matches (e.g., semifinals, finals) may be represented by slots on the narrower parts of the bracket. Such structure may be provided by content source server 210, as well as identifiers for streams (which may or may not yet be available) in the collection that are respectively designated for each respective slot in the structure. As the content source server 210 releases a new digital content stream for inclusion in the collection, the associated identifier may allow content mapping server 240 to identify the slot designated for that new stream and to provide the associated link in the identified slot.

In step 420, a spectator associated with a user device 250 may make a request to browse through the collection. Referring to the example above, the user device 250 may request streams associated with a particular tournament. Other types of content collections may be searched, including those related to various sports, esports, arts, etc. The browsing request may be sent by user device 250 to content mapping server 240.

In step 430, a mapped view may be generated in response to the browsing request based on the stored map structure for the collection. A mapped view (such as illustrated in FIG. 3) may be generated that illustrates—via the illustrated tiers and rounds and arrangement therein—certain contextual information regarding the digital content streams in the collection. Specifically, a spectator may discern relative timing and significance of each match based on the location of the associated slot within the mapped view.

In step 440, the mapped view may initially include slots for digital content streams that are not yet available. As each digital content stream becomes available, however, the mapped view may be updated to add a link (to the now-available stream) to the associated slot. In some embodiments, user feedback from other spectator devices may be used to update slots associated with currently available streams. For example, user feedback (e.g., emoji selections) may be tracked, and the mapped view may be updated to indicate that 20 "happy face" or "thumbs up" emojis have been tracked for a specific stream. Other indicators may also be provided for trending or rare events, predicted upsets, or any other in-stream event, which may further be indicated at specific points within the play-time of the respective stream.

In step 450, the browsing activity of the user device 250 may be monitored to identify any input indicative of a selection from among the illustrated slots of the mapped view. Exemplary input may include pausing/hovering of a cursor over a slot, as well as selection input such as clicking on a link provided in a slot. Information regarding such input may be provided to content mapping server 240 for evaluation.

In step 460, the digital content stream associated with the selection may be identified by content mapping server 240, which may then retrieve the identified digital content stream from the associated content source server 210. The retrieved digital content stream may then be provided to the user device 250 for play.

Figure 5:
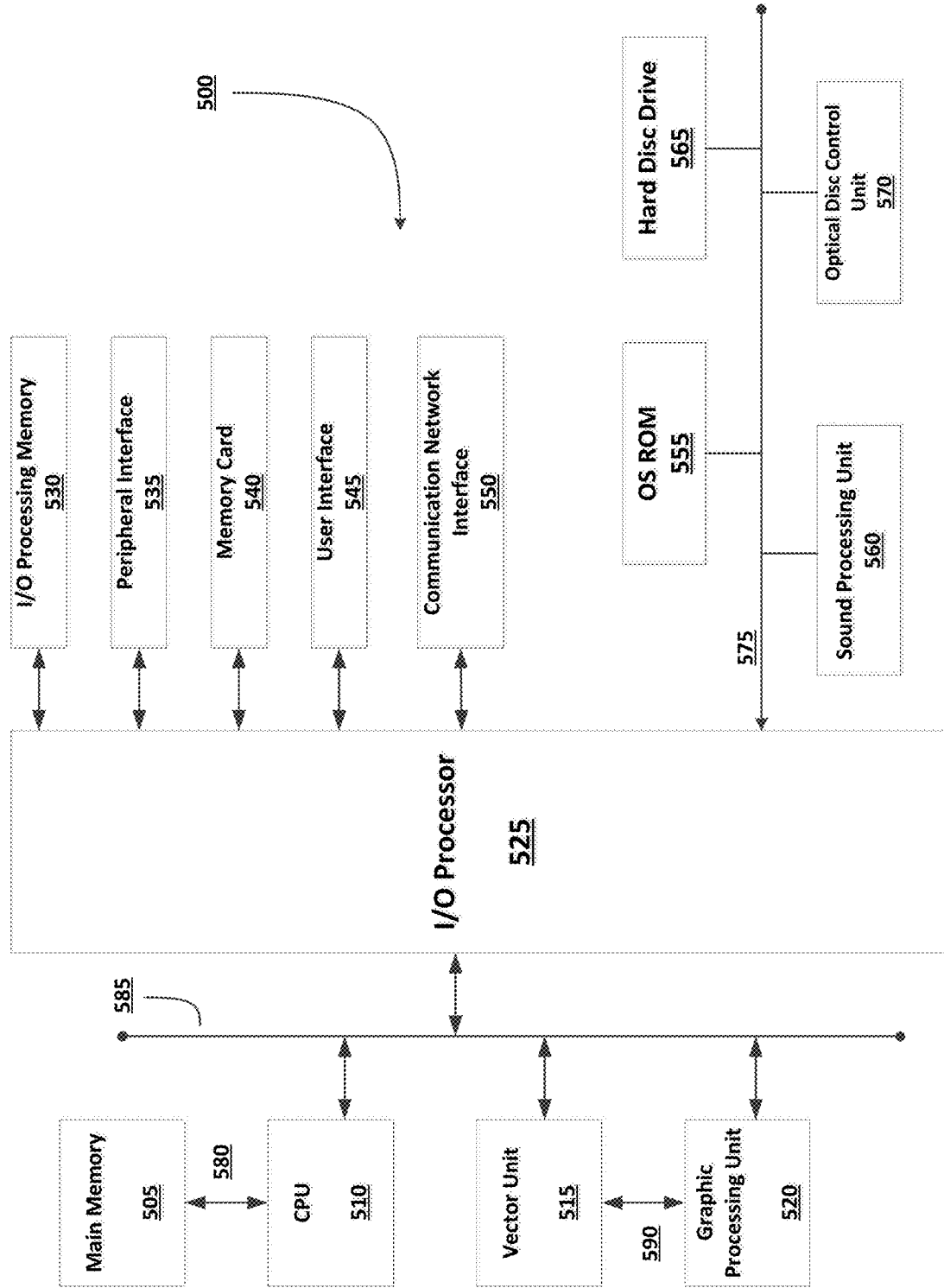
FIG. 5 is an exemplary electronic entertainment system that may be used to provide mapped views of digital content.

FIG. 5 is an exemplary client electronic entertainment system that may be used in shadow testing. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 5G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for providing mapped views of digital content, the system comprising:
   a database in memory that stores a map structure of an online tournament, wherein the map structure assigns one or more of a collection of digital content streams from a content provider to each slot within a predetermined plurality of slots arranged in one or more tiers, wherein each slot is associated with one or more perspectives of a match by one or more players participating in the match;
   a communication interface that receives a browsing request from a spectator device over a communication network, wherein the browsing request pertains to the collection of digital content streams associated with the online tournament; and
   a processor that executes instructions stored in memory, wherein execution of the instructions by the processor:
      generates a mapped view of the requested collection for presentation within a graphical user interface, wherein the mapped view illustrates the predetermined plurality of slots arranged in the tiers in accordance with the stored map structure of the online tournament, wherein at least one of the slots of the generated mapped view is initially associated with one or more live digital content streams scheduled for a future time,
      populates the at least one slot with one or more links to the associated live digital content streams as the associated live digital content streams are made available for streaming,
      evaluates information regarding browsing activity by the spectator device within the generated mapped view to identify when the spectator device selects at least one of the links populating the at least one slot, and
      launches play of one of the live digital content streams associated with the selected link, wherein the launched digital content stream is identified as associated with one of the perspectives of the match associated with the at least one slot.

2. The system of claim 1, wherein the live digital content streams are hosted by the content provider after the match is concluded and wherein the processor updates the at least one slot of the generated mapped view with one or more links to the hosted digital content.

3. The system of claim 1, wherein the browsing activity by the spectator device is indicative of a request for a preview of the selected slot, and wherein the launched digital content stream is played in a preview window.

4. The system of claim 1, wherein the communication interface further receives feedback from the spectator device at a point in time during play of the launched digital content stream, and the processor updates the generated mapped view with a marking indicative of the received feedback at the point in time.

5. The system of claim 4, wherein the received feedback is a selection from a menu of feedback types, the menu being presented in conjunction with the play of the launched digital content stream.

6. The system of claim 5, wherein the feedback types in the menu include one or more emojis.

7. The system of claim 1, wherein the communication interface further receives metadata regarding an in-stream event of one of the digital content streams, and the processor further updates the generated mapped view with an indicator of the in-stream event based on the received metadata.

8. The system of claim 1, wherein the processor further makes a prediction about the launched digital content stream based on one or more in-stream events of the launched digital content stream, wherein one or more markings corresponding to the in-stream events are added to the generated mapped view based on the prediction.

9. The system of claim 8, wherein the communication interface sends a notification to another spectator device regarding the prediction, wherein the other spectator device is not currently accessing the launched digital content stream.

10. The system of claim 8, wherein the prediction pertains to a winner of a match associated with the launched digital content stream, and wherein the communication interface sends a notification to another player device that is slotted to play against the predicted winner in a next tier.

11. The system of claim 8, wherein the prediction is further based on stored historical data, and further comprising updating the historical data regarding the prediction.

12. The system of claim 1, wherein the perspectives associated with the at least one slot each correspond to a different player participating in the match associated with the at least one slot, and wherein the spectator device selects a plurality of the links populating the at least one slot for simultaneous viewing of a plurality of the live digital content streams associated with the match.

13. A method for providing mapped views of digital content, the method comprising:
storing a map structure of an online tournament, wherein the map structure assigns one or more of a collection of digital content streams from a content provider to each slot within a predetermined plurality of slots arranged in one or more tiers, wherein each slot is associated with one or more perspectives of a match by one or more players participating in the match;
receiving a browsing request from a spectator device over a communication network, wherein the browsing request pertains to the collection of digital content streams associated with the online tournament;
generating a mapped view of the requested collection for presentation within a graphical user interface, wherein the mapped view illustrates the predetermined plurality of slots arranged in the tiers in accordance with the stored map structure of the online tournament, wherein at least one of the slots of the generated mapped view is initially associated with one or more live digital content streams scheduled for a future time;
populating the at least one slot with one or more links to the associated live digital content streams as the associated live digital content streams are made available for streaming;
evaluating information regarding browsing activity by the spectator device within the generated mapped view to identify when the spectator device selects one of the links populating the at least one slot; and
launching play of one of the live digital content streams associated with the selected link, wherein the launched digital content stream is identified as associated with one of the perspectives of the match associated with the at least one slot.

14. The method of claim 13, wherein the live digital content streams are hosted by the content provider when the match is concluded, and further comprising updating the at least one slot of the generated mapped view with one or more links to the hosted digital content stream.

15. The method of claim 13, further comprising that browsing activity by the spectator device is indicative of a request for a preview of the selected slot, wherein the launched digital content stream is played in a preview window.

16. The method of claim 13, further comprising receiving feedback from the spectator device at a point in time during play of the launched digital content stream, and updating the generated mapped view with a marking indicative of the received feedback at the point in time.

17. The method of claim 16, wherein the received feedback is a selection from a menu of feedback types, the menu being presented in conjunction with the play of the launched digital content stream.

18. The method of claim 17, wherein the feedback types in the menu include one or more emojis.

19. The method of claim 13, further comprising receiving metadata regarding an in-stream event of one of the digital content streams, and updating the generated mapped view with an indicator of the in-stream event based on the received metadata.

20. The method of claim 13, further comprising making a prediction about the launched digital content stream based on one or more in-stream events of the launched digital content stream, wherein one or more markings corresponding to the in-stream events are added to the generated mapped view based on the prediction.

21. The method of claim 20, further comprising notifying another spectator device regarding the prediction, wherein the other spectator device is not currently accessing the launched digital content stream.

22. The method of claim 20, wherein the prediction pertains to a winner of a match associated with the launched digital content stream, and further comprising notifying another player device that is slotted to play against the predicted winner in a next tier.

23. The method of claim 20, wherein the prediction is further based on stored historical data, and further comprising updating the historical data regarding the prediction.

24. A non-transitory computer-readable storage medium, having embodied thereon a program executable by a processor to perform a method for providing mapped views of digital content, the method comprising:
storing a map structure of an online tournament, wherein the map structure assigns one or more of a collection of digital content streams from a content provider to each slot within a predetermined plurality of slots arranged in one or more tiers, wherein each slot is associated with one or more perspectives of a match by one or more players participating in the match;
receiving a browsing request from a spectator device over a communication network, wherein the browsing request pertains to the collection of digital content streams associated with the online tournament;
generating a mapped view of the requested collection for presentation within a graphical user interface, wherein the mapped view illustrates the predetermined plurality of slots arranged in the tiers in accordance with the stored map structure of the online tournament, wherein at least one of the slots of the generated mapped view is initially associated with one or more live digital content streams scheduled for a future time;
populating the at least one slot with one or more links to the associated live digital content streams as the associated live digital content streams are made available for streaming;
evaluating information regarding browsing activity by the spectator device within the generated mapped view to identify when the spectator device selects one of the links populating the at least one slot; and
launching play of one of the live digital content streams associated with the selected link, wherein the launched digital content stream is identified as associated with one of the perspectives of the match associated with the at least one slot.

25. The method of claim 13, wherein the perspectives associated with the at least one slot each correspond to a different player participating in the match associated with the at least one slot, and wherein the spectator device selects a plurality of the links populating the at least one slot for simultaneous viewing of a plurality of the live digital content streams associated with the match.

\* \* \* \* \*